US010158576B2

(12) United States Patent
Kazanchian

(10) Patent No.: US 10,158,576 B2
(45) Date of Patent: Dec. 18, 2018

(54) RADIO FREQUENCY MODULE

(71) Applicant: RF Digital Corporation, Hermosa Beach, CA (US)

(72) Inventor: Armen E. Kazanchian, Hermosa Beach, CA (US)

(73) Assignee: RF Digital Corporation, Hermosa Beach, CA (US)

( * ) Notice: Subject to any disclaimer, the term of this patent is extended or adjusted under 35 U.S.C. 154(b) by 0 days.

(21) Appl. No.: 15/552,503

(22) PCT Filed: Feb. 26, 2016

(86) PCT No.: PCT/US2016/019919
§ 371 (c)(1),
(2) Date: Aug. 22, 2017

(87) PCT Pub. No.: WO2016/138470
PCT Pub. Date: Sep. 1, 2016

(65) Prior Publication Data
US 2018/0048344 A1 Feb. 15, 2018

Related U.S. Application Data

(60) Provisional application No. 62/121,478, filed on Feb. 26, 2015.

(51) Int. Cl.
*H04M 1/00* (2006.01)
*H04L 12/823* (2013.01)
(Continued)

(52) U.S. Cl.
CPC ............... *H04L 47/32* (2013.01); *H04B 1/40* (2013.01); *H04B 7/145* (2013.01); *H04B 7/15* (2013.01);
(Continued)

(58) Field of Classification Search
CPC .. H05K 1/0218; H05K 1/0224; H05K 1/0225; H05K 1/0243; H05K 1/05; H05K 3/403; H05K 2201/10371; H05K 2201/0723; H04B 1/40; H04B 7/145; H04B 7/15; H04L 47/32; H04L 47/28; H04L 67/10; H04L 67/26; H04W 76/25; H04W 4/80; H04W 56/002
(Continued)

(56) References Cited

U.S. PATENT DOCUMENTS 5,677,511 A * 10/1997 Taylor ................... G06F 13/409
174/527
2006/0121941 A1* 6/2006 Shiflett ................ G06K 7/0021
455/558

(Continued)

OTHER PUBLICATIONS

International Search Report issued by ISA/US for PCT/US2016/019919 (dated May 17, 2016).

*Primary Examiner* — Edward Urban
*Assistant Examiner* — Max Mathew
(74) *Attorney, Agent, or Firm* — Fish & Richardson P.C.

(57) ABSTRACT

A radio frequency module may include a transceiver positioned on a circuit board, a crystal positioned on the circuit board, an antenna positioned on the circuit board, and a shield positioned over the transceiver and crystal. The shield may include an upper surface and a plurality of legs coupling the upper surface to the circuit board.

17 Claims, 6 Drawing Sheets

(51) Int. Cl.
- *H04B 7/15* (2006.01)
- *H04L 12/841* (2013.01)
- *H04W 56/00* (2009.01)
- *H04B 7/145* (2006.01)
- *H04W 4/80* (2018.01)
- *H04W 76/25* (2018.01)
- *H04B 1/40* (2015.01)
- *H04B 1/3827* (2015.01)
- *H04L 29/08* (2006.01)
- *H04W 4/38* (2018.01)

(52) U.S. Cl.
CPC .............. *H04L 47/28* (2013.01); *H04L 67/10* (2013.01); *H04L 67/26* (2013.01); *H04W 4/80* (2018.02); *H04W 56/002* (2013.01); *H04W 76/25* (2018.02); *H04B 1/3838* (2013.01); *H04L 67/12* (2013.01); *H04W 4/38* (2018.02); *Y02D 70/122* (2018.01); *Y02D 70/142* (2018.01); *Y02D 70/144* (2018.01); *Y02D 70/164* (2018.01); *Y02D 70/22* (2018.01); *Y02D 70/446* (2018.01)

(58) Field of Classification Search
USPC .......... 455/575.1, 575.5; 340/572.1; 370/338; 439/607
See application file for complete search history.

(56) References Cited

U.S. PATENT DOCUMENTS

| | | | |
|---|---|---|---|
| 2008/0096422 A1* | 4/2008 | Liao | H01R 13/6582 439/607.01 |
| 2010/0060454 A1* | 3/2010 | Kazanchian | H05K 1/0218 340/572.1 |
| 2010/0097757 A1* | 4/2010 | Wang | H05K 9/0032 361/693 |
| 2012/0273926 A1* | 11/2012 | Pagaila | H01L 23/552 257/659 |

\* cited by examiner

RADIO FREQUENCY MODULE

PRIORITY

This application claims priority to U.S. Application No. 62/121,478, filed Feb. 26, 2015, which is incorporated by reference in its entirety herein.

BACKGROUND

Electrical components are attached to a circuit board or substrate and then electrically linked to form the desired electronics. The electronic assembly is generally encased or filled with a plastic molding compound to protect the electrical components. This "potting" process covers and fills the electronic assembly to protect the components, contacts, and connections from breakage, such as from shock or vibration, or from deterioration or electric malfunctions such as from moisture or corrosive agents. This process also allows components on the surface to be placed much closer to each other as they are captured and kept in position by the potting, this allows for a size reduction advantage.

Although there is substantial protection benefits to encasing the electrical components in this way, the electrical assembly may provide difficulties in the manufacturing process. For example, certain components may need to be covered or shielded to prevent interference to or from other components or the environment. These typically restrict or limit the potting processes to be fully realized and may substantially complicate manufacturing.

For example, U.S. Pat. No. 8,610,573 discloses a radio frequency module and methods of transmitting and receiving data; the disclosure of which is incorporated by reference in its entirety. This patent discloses a transceiver assembly located on a printed circuit board. A ground plane is formed on the first surface and surrounds at least a substantial portion of the transceiver assembly. A radio frequency shield is electrically coupled to the ground plane and covers at least a substantial portion of the transceiver assembly. To obtain the benefits of the shield and ground plane, the shield and ground plane are shown as fully enclosing the electronic components of the transceiver assembly.

SUMMARY

Exemplary embodiments described herein include radio frequency (RF) modules. Exemplary embodiments include novel components and arrangements for improving manufacturing and reduce product costs. Exemplary embodiments may alternatively or in addition reduce RF module size, while maintaining the integrity of placement (location) of components.

DRAWINGS

DESCRIPTION

The following detailed description illustrates by way of example, not h way of limitation, the principles of the invention. This description will clearly enable one skilled in the an to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Figure 1:
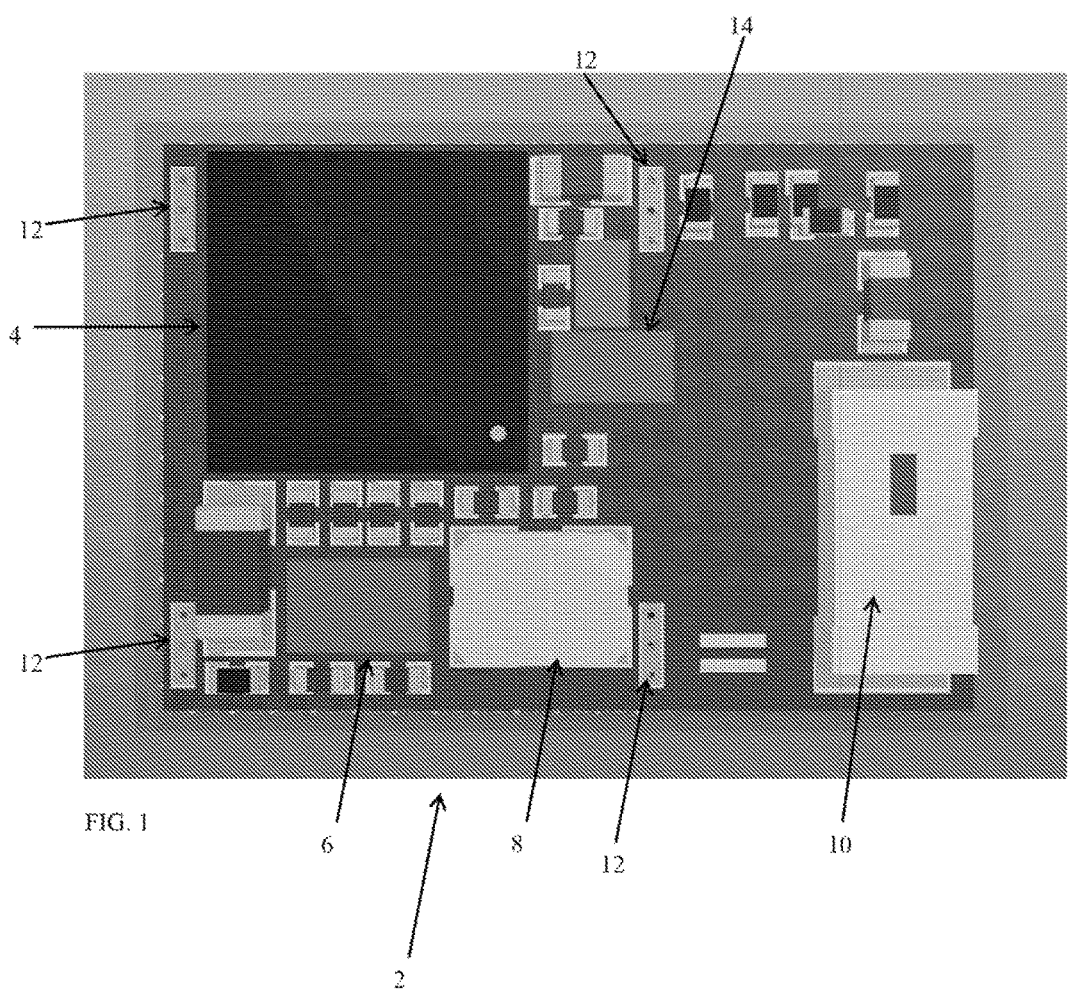
FIG. 1 illustrates a top elevation view of an exemplary circuit board according to embodiments of the invention, with a shield removed.
Figure 2:
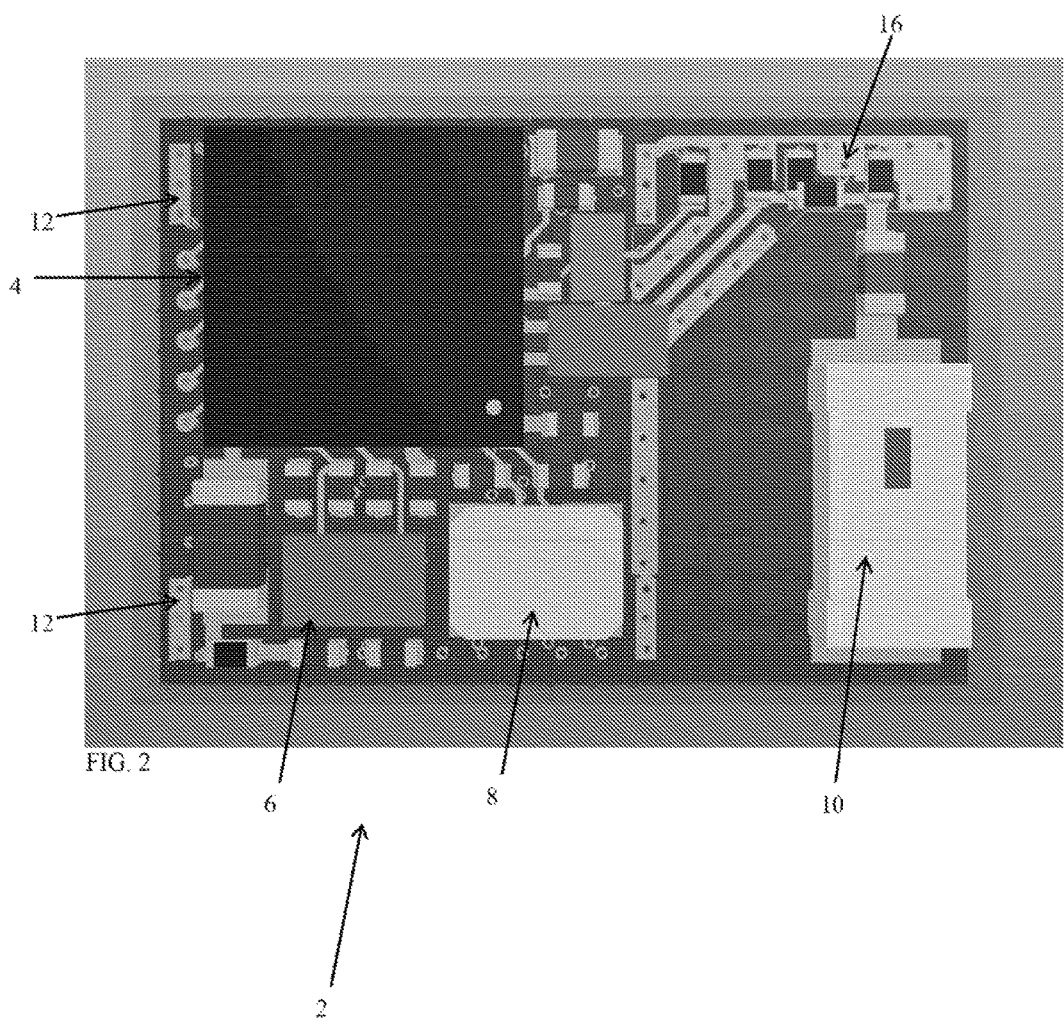
FIG. 2 illustrates a top elevation view of the FIG. 1 exemplary circuit board with leads between components.
Figure 3:
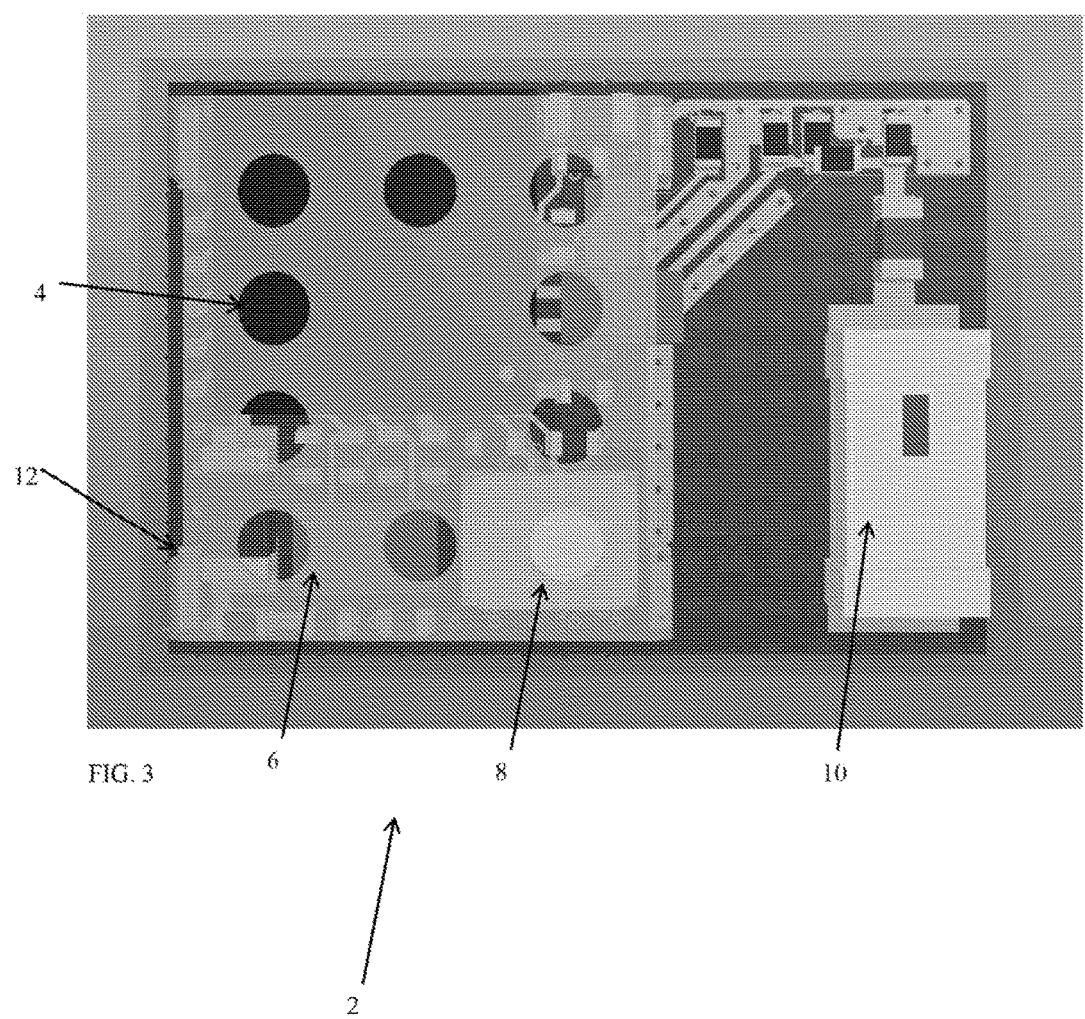
FIG. 3 illustrates a top elevation view of the FIG. 2 exemplary circuit board with a shield.
Figure 4:
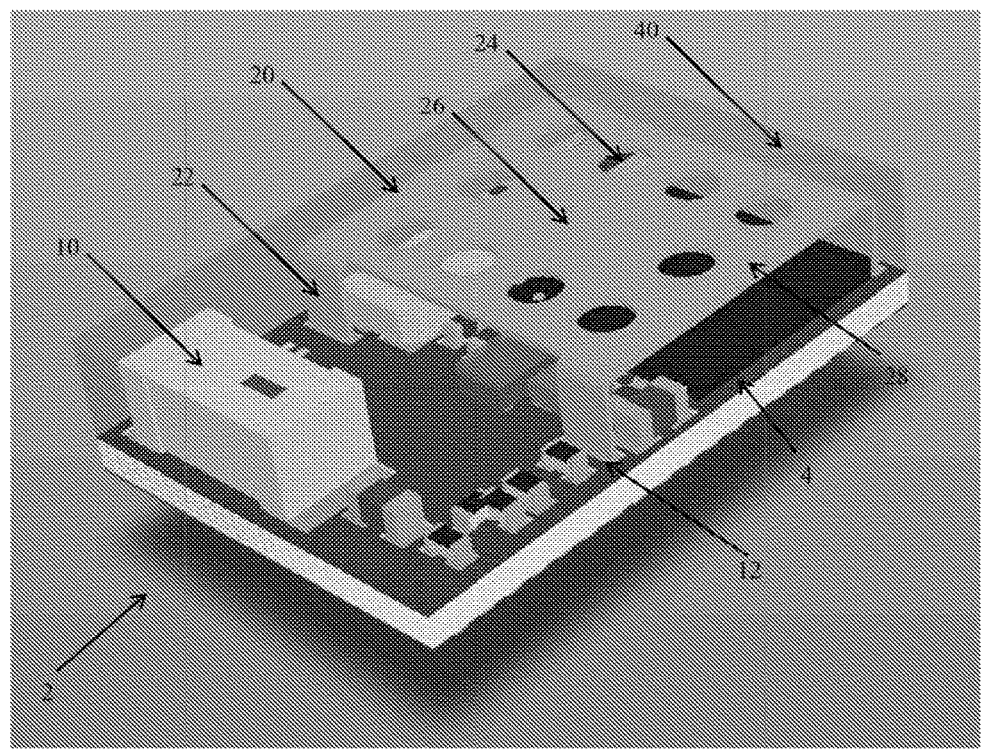
FIG. 4 illustrates a perspective view of the FIG. 3 exemplary circuit board.

FIG. 1 illustrates a top elevation view of an exemplary circuit board according to embodiments of the invention, with a shield removed. FIG. 2 illustrates a top elevation view of the FIG. 1 exemplary circuit board with leads between components. FIG. 3 illustrates a top elevation view of the FIG. 2 exemplary circuit board with a shield. FIG. 4 illustrates a perspective view of the FIG. 3 exemplary circuit board. FIGS. 5-8 illustrate orthogonal side views of the FIG. 3 exemplary circuit board.

The exemplary circuit board 2 can include a microcontroller radio transceiver 4 and at least one crystal 6, or additional crystals 8, and an antenna 10. The antenna 10 may be in many forms including printed on the circuit board itself, however next to the shielded area. A balun 14 may or may not be included a needed by the application. Other components may also be included such as for filtering and matching. The components may be electrically coupled by leads 16 on or between one or more circuit boards.

In an exemplary embodiment, the crystal 6 and crystal 8 are kept relatively close to microcontroller radio transceiver 4 to keep the crystal traces as short as possible. The reduced trace lengths keep the emission from the frequency produced by the crystal and its traces to a minimum so it will not interfere with the antenna 10 or balun 14 area of the design. Exemplary embodiments also may include matching components too, but is not always required. The matching components as shown are on an upper right side of the circuit board. As shown, the passive components (inductors and capacitors) generally form an L shape, which is then connected to a 45 degree trace, then it leads into the balun chip and does not use a long series of capacitors and inductors. The balun improves performance over a long series of inductors and capacitors as ifs a single chip solution. Therefore, the balun may fully replace the long serial string of components that runs parallel to the antenna in previous chip configurations.

Regarding the location of the antenna 10, it can be a printed antenna on the printed circuit board to keep it flat. It can also be oriented in the way shown to allow for minimal blocking of the potting compound from flowing in from the top side of the circuit board and flow over all the components without causing physical resistance to the flow. Also, the antenna being located on the side of the board as shown at the distance allows the near-by shield to be generally electromagnetically coupled to the antenna, thereby funning larger structure for emitting and receiving RF energy. The distance, orientation of the shield and the antenna in this specific case all work together to achieve the best performance possible out of this small size structure, which otherwise would not be possible.

The circuit board may include three or four contact pads 12 for a shield. The contact pads may be parallel and form two linearly aligned groups. For the example shown, four pads 12 may each define elongate contact points, where two pads on one side of the microcontroller radio transceiver 4 may be linearly aligned, and two pads on an opposite side of the microcontroller radio transceiver 4 may be linearly aligned. The two pairs of linearly aligned pads may be parallel. The pads may also be aligned such that the length dimension (the longest side) is aligned with other components length dimension. As shown, a majority of components may align such that the length dimensions of a majority of components are parallel. The three or more contact pads 12 may also be parallel to the majority of aligned components. The comparison of aligned components may be across the entire circuit board or of those covered by shield 20.

The shield legs 22 may attach to the circuit board at the contact pads 12. The shield legs 22 may therefore be arranged in two planar, parallel rows. The shield legs 22 may extend downward from the shield upper surface 28 on opposing sides. Shield legs 22 may also be at or near opposing ends of each opposing side, such that the legs are generally positioned adjacent the corners of the shield. As shown each leg 22 is a planar extension of the upper surface 28 that is bend downward, generally orthogonal to the upper surface 28. The bend may be discontinuous or sharp to project essentially straight downward, squared off to the upper surface 28. The bend may also be continuous or curved at a given radius to permit easier flow of molding material during the potting process and reduce pockets of air or gaps being formed within the potting material. The shield therefore may include opposing open sides orthogonal to the sides in which the legs partially extend. The legs 22 have a length dimension along the side of the shield. The leg length dimension is preferably less than a quarter of the length of the shield. In this configuration, less than a majority or less than half of the side is covered or enclosed by shield legs 22. The contact pads and corresponding shield legs may define less than a quarter of the perimeter of the shield. Even with the legs to support the shield, all sides of the shield include at least an open allowing flow of molding compound to secure components. The opening may be at least 50%, 60%, 70%, 75%, 80%, 90%, or 100% of the length of the given side. The desired opening length may be determined based on the molding compound used and the shielded and/or unshielded component arrangement.

The shield 20 includes an upper surface 28 supported by shield legs 22. The upper surface 28 may be a generally planar surface of a radio frequency shielding material. The upper surface 28 may include one or more apertures 24. As shown, the apertures 24 are arranged adjacent the peripheral edge or perimeter of the shield upper surface 28. The aperture 24 arrangement therefore defines a solid central region 26. The solid central region 26 diameter may include approximately half (such as 40%-60%) of the diameter of the shield upper surface. However, any arrangement of apertures may be used. As shown, the apertures 24 are circular, but they may be any convenient shape.

Exemplary embodiments of the shield are pick and placable for automated assembly. For example, the solid central region 26 may for a pick up region in the center of the RF module without holes in it for vacuum pick up and placement onto the circuit board during manufacture.

The contact pads 12 and corresponding shield legs 22 are generally arranged parallel to each other to facilitate the plastic molding to more easily flow in and around the connected shield. The arrangement and configuration also minimizes the blockage of molding compound, reducing the amount of pressure that needs to be applied to cause the compound to flow. As shown, for example in FIG. 4, the shield includes two completely open sides on opposing ends of the shield and RF module to permit the plastic molding material to be injected at one end and more easily flow through to the opposing end. The shield legs are also aligned and provide a minimum dimension facing the same sides as the open ends of the shield. The shield upper surface apertures further allow flow pathways for the molding material and/or expelled air. By reducing the impediment to the flow of molding material, a low pressure may be used to inject the molding material onto the circuit board. The reduced pressure reduces the potential damage and possible displacement of the components and damage between components and the top surface of the board. Therefore, the lower pressure helps not damage other parts on the board during the molding process. Accordingly, the shape of the metal shield allows for minimal contact points on the PCB and minimized the flow impediment, which allows for flow of molding compound to flow under shield and surround and capture the shield as well as the components under it.

The openings along the sides of the shield and reduced profile of the shield legs permit a smaller amount of contact to the top surface. This configuration also allows for an overall smaller RF module size as components can be pushed out to the very peripheral edges of the board. Also the very small size shield lets allow for less area for the molding compound to potentially rah onto and move the shield (actually its possible to rip it right off the board with the molding pressure) so the exemplary design allows it to be anchored in those edge locations, while providing large openings for the mold flow to not lift the shield, and prevent obvious damage to the product.

FIG. 4 illustrates an exemplary application of the potting material 40 around the components and shield. The applied potting material fills a space between the rusted circuit board and the interior surface of the shield. The potting material may also cover an exterior surface of the shield and the rest of the circuit board to define a generally rectangular module.

Figure 9:
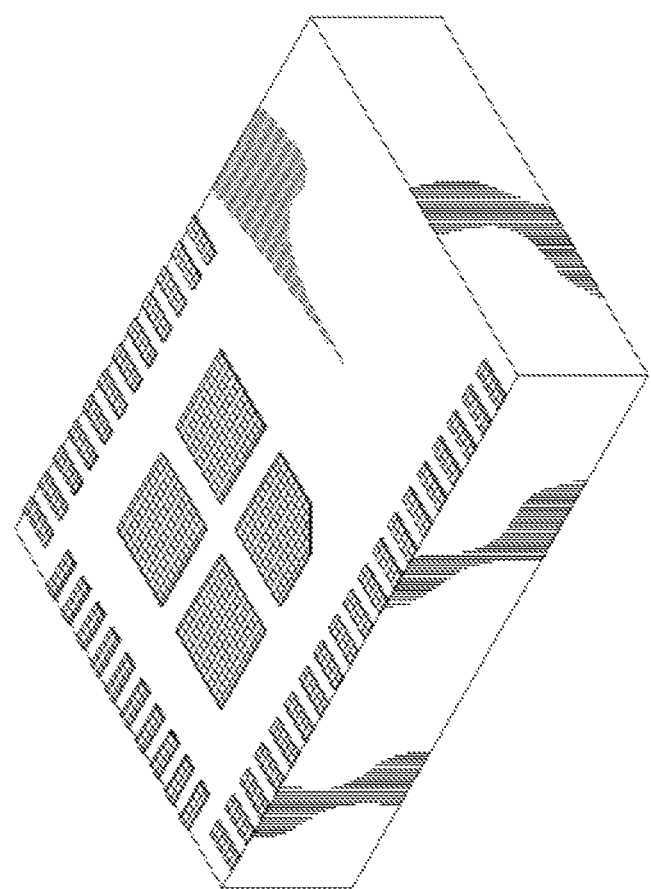
FIG. 9 illustrates a bottom perspective view of FIG. 3 including external contacts and encased in molding material (i.e. potted).

As partially shown in FIG. 9, the pads on the edges of the bottom of the RF module may come all the way to the edge of the circuit board and be flush to the sides of the RF module, allowing easy inspection of soldering.

Figure 5:
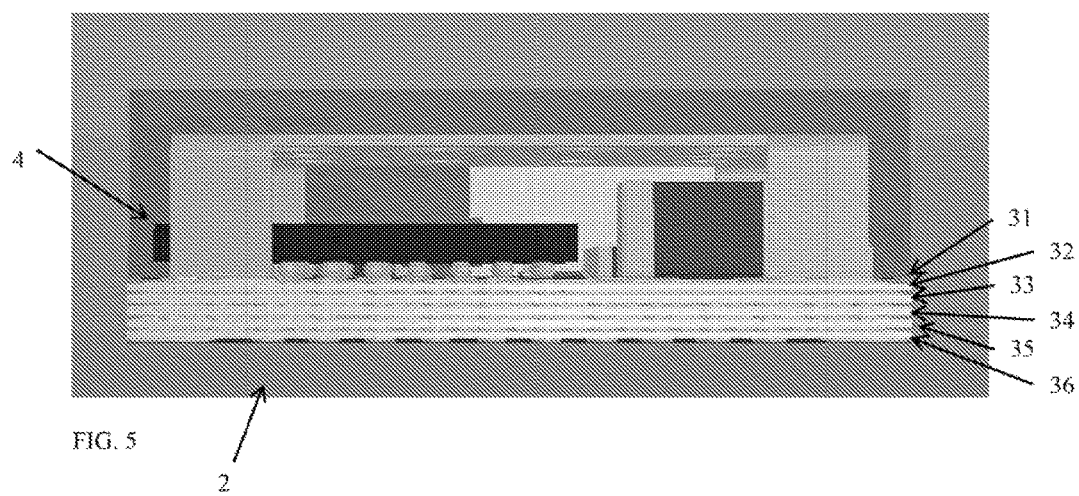
FIG. 5 illustrates a first side view of the FIG. 3 exemplary circuit board.
Figure 6:
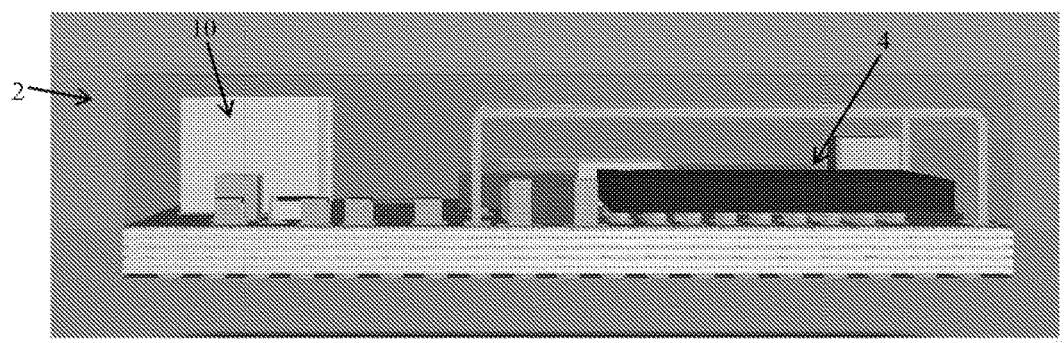
FIG. 6 illustrates a second side view a the FIG. 3 exemplary circuit board.
Figure 7:
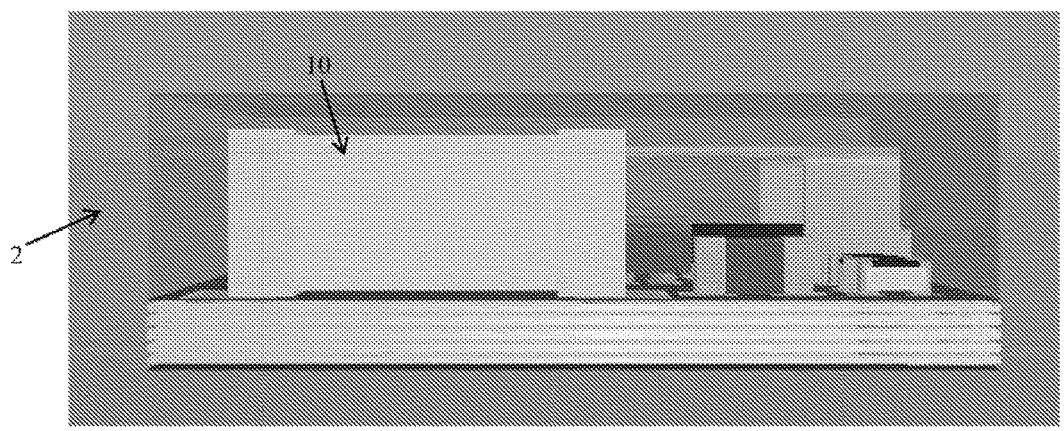
FIG. 7 illustrates a third side view of the FIG. 3 exemplary circuit board.
Figure 8:
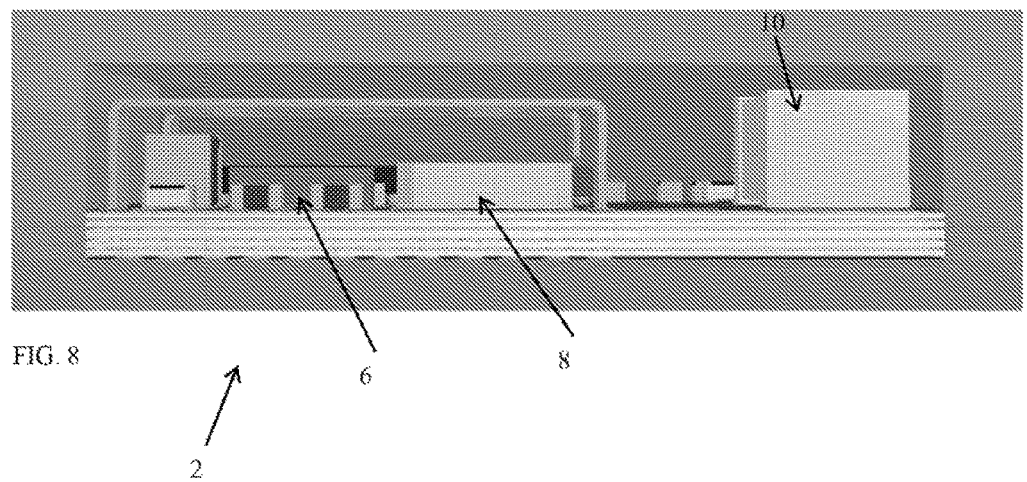
FIG. 8 illustrates a fourth side view of the FIG. 3 exemplary circuit board.

As seen in FIG. 5, six circuit boards 31, 32, 33, 34, 35, and 36 may be used to electrically connect the components. In an exemplary embodiment, there are a minimum of six layered circuit boards. The interconnects from layer to layer on the circuit board may be micro-vias (4 millimeter size laser drilled). The circuit boards may be printed circuit boards that can be stacked on top of each other.

Exemplary embodiments may be used to mass produce radio frequency modules. For example, the shield attachment may be automated with the pick and place configuration of the shield upper surface. Once the components are assembled, many RF modules may be molded in a single batch. For example, the modules may be generally arranged in a planar array. Mold material may be liquefied or fluidlike so that it flows from one side of the shield to the other across the array of shields. The RF module arrangement and configuration facilitates or at least minimizes the impediments to the flow of the mold material. Therefore, the mold material can flow around quickly and easily, speeding production cycle time and reducing manufacturing costs. Exemplary manufacturing processes and resulting RF modules may produce higher yields due to improved coverage of components under shield, while preventing or reducing voids which store moisture and eventually cause cracking of the molded structure.

In an exemplary embodiment, the molding compound can flow from one side of the module to the other. If looking at FIG. 4, for example, the compound flows from the right to the left and there are many modules like this all attached to each other and it flows through all of them at once, then later they are singulated, forming the clean finished surfaces on the 4 sides.

Exemplary embodiments of the described RF module may be used as a component in another manufacturer's product. The other product may similarly go through a reflow soldering process which, without a potted or concealed RF module, the components would otherwise potentially move out of place and cause shorts. Exemplary embodiments may prevent or reduce this occurrence as the mold material, once hardened, cannot move since the potting forms cavities surrounding the components in the module keeping them in their original locations. Accordingly, the production yield is improved, production costs are reduced, and overall module size is minimized.

Exemplary embodiments may also allow another product manufacturer to place exemplary embodiments of the RF module on the bottom of their circuit board, not only the top. As normally if there was no potting and the module was placed on the bottom the shield as well as many other large mass components would easily fall off the hoard during the reflow process due to gravity pulling down on them. What keeps the whole module on the larger board to which the module itself is attached is a small amount of glue that is applied by the manufacturer before they put it into the reflow soldering process. However, the manufacturer can never apply that glue to the components of the module itself therefore making it nearly impossible to take advantage of that space saving process of placing other RF modules on the bottom of their board. The manufacturer can now, using exemplary embodiments described herein, make use of the top surface of their printed circuit boards as well the bottom surface for mounting the module.

In addition, or alternatively thereto, the thin edge of the shield where it lands on die circuit board pads allows for minimal surface area to be consumed for the attach points, the illustrated four attachment points, keep the shield very well registered without the need for registration holes on the circuit board.

Although embodiments of this invention have been fully described with reference to the accompanying drawings, it is to be noted that various changes and modifications will become apparent to those skilled in the art. Such chances and modifications are to be understood as being included within the scope of embodiments of this invention as defined by the appended claims. For example, different features and configurations are provided in a single RF module description. However, any combination of features may be used to achieve the desired benefits. No one or more feature is necessary to the practice of the invention. Therefore, for example, the circuit board pads and corresponding shield legs do not have to be confined or limited to opposing sides of the shield as described, or do nor need to be aligned parallel across the hoard, or could be used with registration holes. Therefore, any combination of features or subfeatures may be combined in any manner to achieve a particular result.

The invention claimed is:

1. A radio frequency module, comprising:
   a transceiver positioned on a circuit board;
   a crystal positioned on the circuit board;
   an antenna positioned on the circuit board; and
   a shield positioned over the transceiver and crystal, the shield comprising a substantially planar surface having one or more apertures therein, the substantially planar surface being parallel to the circuit board, the shield having at least three legs coupling the substantially planar surface of the shield to the circuit board, wherein the legs extend from a perimeter of the substantially planar surface, each leg having a length dimension along a respective side of the perimeter, the length dimension being less than a quarter of a length of the respective side of the perimeter such that there is an opening at each side along the perimeter, each opening being at least 50% the length of the respective side.

2. The radio frequency module of claim 1, wherein the shield comprises four legs generally parallel, the legs comprising a height dimension between the circuit board and the shield upper surface, a major dimension along a maximum length orthogonal to the height dimension and a minor dimension along a minimum length orthogonal to the height dimension and the major dimension.

3. The radio frequency module of claim 2, wherein the major dimension of the shield legs are parallel to one another.

4. The radio frequency module of claim 3, wherein the shield legs are generally planar and a first pair of legs are aligned in a first plane and a second pair of legs are aligned in a second plane.

5. The radio frequency module of claim 4, wherein the first plane and second plane are parallel.

6. The radio frequency module of claim 2, wherein the four legs extend from opposing sides of the shield upper surface.

7. The radio frequency module of claim 6, wherein the four legs extend around less than half of a perimeter of the shield supper surface.

8. The radio frequency module of claim 7, wherein different opposing sides of the shield are open.

9. The radio frequency module of claim 1, wherein the shield upper surfaces comprises a plurality of apertures.

10. The radio frequency module of claim 9, wherein the plurality of apertures are arranged adjacent a peripheral edge of the shield.

11. The radio frequency module of claim 10, wherein the shield upper surface comprises a solid central region.

12. The radio frequency module of claim 11, wherein a diameter of the solid central region is at least half of a diameter of the shield along a same line.

13. The radio frequency module of claim 1, further comprising a molding compound covering the transceiver, crystal, and shield.

14. The radio frequency module of claim 13, wherein the molding compound covers the antenna.

15. The radio frequency module of claim 13, wherein molding compound is positioned between the circuit board and the shield, such that mold compound is within an interior cavity of the shield.

16. The radio frequency module of claim 15, further comprising electrical contacts on a side of the radio frequency module.

17. The radio frequency module of claim 16, wherein the electrical contacts extend to a peripheral edge of the side of the radio frequency module.

* * * * *

UNITED STATES PATENT AND TRADEMARK OFFICE
CERTIFICATE OF CORRECTION

PATENT NO. : 10,158,576 B2
APPLICATION NO. : 15/552503
DATED : December 18, 2018
INVENTOR(S) : Armen E. Kazanchian It is certified that error appears in the above-identified patent and that said Letters Patent is hereby corrected as shown below:

In the Claims

Column 6
Claim 7, Line 46, delete "supper" and insert -- upper --.

Signed and Sealed this
Twelfth Day of February, 2019

Andrei Iancu
*Director of the United States Patent and Trademark Office*